United States Patent Office 3,783,054
Patented Jan. 1, 1974

3,783,054
HIGH ENERGY BERYLLIUM ROCKET FUEL
COMPOSITIONS AND PROCESSES THEREFOR
Everett M. Marlett and Robert N. Sanders, Baton Rouge,
La., assignors to Ethyl Corporation, Richmond, Va.
No Drawing. Original application Oct. 24, 1967, Ser. No.
678,489. Divided and this application Apr. 10, 1969,
Ser. No. 822,836
Int. Cl. C06d 5/08
U.S. Cl. 149—109          5 Claims

ABSTRACT OF THE DISCLOSURE

A composition useful as a high energy liquid rocket fuel or a chemical intermediate prepared by reacting beryllium hydride in dicyclopentadienyl beryllium.

---

This application is a division of application Ser. No. 678,489, filed Oct. 24, 1967.

Beryllium hydride, dissolved in a novel solvent therefor, dicyclopentadienyl beryllium, reacts with the latter on prolonged heating at 105–115° C. to yield cyclopentadienyl beryllium hydride. This compound is useful as an intermediate for cyclopentadienyl beryllium alkyls and as the basis of a low-pressure route to crystalline beryllium hydride.

This invention relates to and has as its principal objects the provision of a novel solvent for beryllium hydride, the provision of the resulting solution and the provision of a novel method for the preparation of cyclopentadienyl beryllium hydride from said solution.

In accordance with the present invention it has been found that when dicyclopentadienyl beryllium or a bis-(mono- or dialkyl cyclopentadienyl) beryllium, wherein each alkyl group may contain up to about 8 carbon atoms, is mixed with beryllium hydride and the mixture is heated to a temperature of 60 to 90° C. for a period of one-half hour to about 10 hours, the beryllium hydride dissolves in the cyclopentadienyl beryllium compound to form a solution stable at ambient temperature. This solution and the foregoing process for its preparation constitute embodiments of the present invention.

Furthermore, it has been found that when the solution prepared as described above is heated to a reaction temperature in the range of from about 105° to about 115° C. under a reduced pressure of from about 0.01 millimeter of mercury to about 1 atmosphere for a period of from about 6 to about 48 hours, a homogeneous liquid product is obtained which contains a simple or substituted cyclopentadienyl beryllium hydride and from which said hydride can be separated by known procedures. This process likewise constitutes an embodiment of the present invention.

Moreover, it has been found in accordance with this invention that a simple or substituted cyclopentadienyl beryllium hydride can be prepared by a two-stage process wherein the first stage comprises the preparation of a solution of beryllium hydride in a simple or substituted dicyclopentadienyl beryllium as described above and the second stage comprises the chemical conversion of said solution to a liquid product containing a simple or substituted cyclopentadienyl beryllium hydride followed by the separation of said hydride from said liquid product by known methods. The foregoing two-stage process is a preferred embodiment of the present invention.

The preparation of unsubstituted cyclopentadienyl beryllium hydride by the foregoing two-stage process is also a preferred embodiment of the present invention. Other embodiments will appear hereinafter.

The process of the present invention offers an important advantage over processes hitherto available for the preparation of organoberyllium compounds from beryllium hydride. Berylium hydride, like many other metallic hydrides, is a polymeric material which because of its high molecular weight is relatively inactive chemically and which must be heated to depolymerization temperature (with consequent danger of thermal decomposition, at least in part, of the beryllium hydride monomer) before olefination will occur. Presumably if the beryllium hydride were in solution it would be present in a monomeric or other low molecular weight form and consequently would be more reactive at lower temperatures. Unfortunately, few if any solvents have been reported for beryllium hydride. The above-disclosed and wholly unexpected solvent power of dicyclopentadienyl beryllium compounds for beryllium hydride is an important advantage of the present invention. The resulting solution is stable and, as indicated above, is a useful raw material for the preparation of cyclopentadienyl beryllium hydride. It is remarkable in that both solvent and solute are beryllium compounds, and both are of interest as potential components of rocket fuels.

EXAMPLE 1

Preparation of dicyclopentadienyl beryllium

Into a 290-milliliter ball mill with one-quarter-inch stainless steel balls were introduced 2.88 grams of beryllium chloride, 12.68 grams of cyclopentadienyl sodium, and 100 milliliters of anhydrous diethyl ether. The system was ball-milled overnight.

The mill contents were filtered through a medium-frit filter using a helium back pressure. The filtrate was sealed in a flask and cooled with a Dry Ice-acetone eutectic. After an hour the ether was distilled to about half its initial volume and the system again cooled. A solid formed in the flask; it was filtered and dried.

The product was sublimed at 40 to 45° C. under an absolute pressure of 0.09 milliliter of mercury, the resulting crystals being collected and weighed in a dry box. The clear white crystals weighed 0.34 gram corresponding to a yield of 6.8 percent on beryllium chloride. An X-ray powder pattern showed the product to be high-purity crystalline dicyclopentadienyl beryllium.

When the process of Example 1 is repeated, except for the replacement of the cyclopentadienyl sodium with methyl cyclopentadienyl sodium, ethyl cyclopentadienyl sodium, n-propyl cyclopentadienyl sodium, isopropyl cyclopentadienyl sodium, n-butyl cyclopentadienyl sodium, isobutyl cyclopentadienyl sodium, tertiary butyl cyclopentadienyl sodium, n-hexyl cyclopentadienyl sodium, n-octyl cyclopentadienyl sodium, isooctyl cyclopentadienyl sodium, dimethyl cyclopentadienyl sodium, diethyl cyclopentadienyl sodium, methylethyl cyclopentadienyl sodium, or mixtures of the foregoing, similar results are obtained.

When the process of Example 1 is repeated except for the replacement of the cyclopentadienyl sodium with cyclopentadienyl lithium, cyclopentadienyl potassium, cyclopentadienyl rubidium or cyclopentadienyl cesium or mixtures thereof, similar results are obtained.

When the beryllium chloride of Example 1 is replaced with beryllium bromide, beryllium iodide, or mixtures thereof, the other reaction conditions remaining unchanged, similar results are obtained.

EXAMPLE 2

Preparation of cyclopentadienyl beryllium hydride

Dicyclopentadienyl beryllium (0.170 gram) and 0.013 gram of 96.7 percent purity beryllium hydride were placed in a glass ampoule which was sealed and heated at 65° C. for 4½ hours. A liquid product was obtained which solidified between 49° and 50° C. (pure dicyclopentadienyl beryllium melts at 60° C.). The mixture was then heated for 24 hours at 80° C. with no change in the properties of the product. However, when the temperature was raised to 110° C. for 24 hours, a colorless liquid was obtained which had a freezing point between 5° and 6° C. The density of the liquid was approximately 0.64 gram per cubic centimeter. This liquid was transferred to a micro vacuum distillation apparatus which was designed to allow the distillate to condense partially at room temperature, and then to pass the uncondensed vapor into a receiver cooled in liquid nitrogen. The liquid was vacuum distilled at 0.04 millimeter while the sample was heated to a final pot temperature of 75° C. All the liquid in the pot was vaporized. White solid (about 1 milligram) was found in the liquid nitrogen-cooled receiver. Infrared analysis of the product revealed only beryllium-hydrogen bridge bonds. The material collected in the room temperature portion of the condenser was subjected to X-ray analysis and was found to have a powder pattern identical to that of dicyclopentadienyl beryllium.

From the above it is evident that the liquid of freezing point 5 to 6° C. was cyclopentadienyl beryllium hydride which decomposed upon distillation to beryllium hydride and dicyclopentadienyl beryllium.

When the above liquid of freezing point 5 to 6° C. is subjected to careful low-temperature distillation in a molecular still, cyclopentadienyl beryllium hydride of a high degree of purity is obtained.

When the above liquid is prepared from a mixture containing a slight excess of beryllium hydride and is extracted at low temperature with petroleum naphtha and the solvent is evaporated from the extract at low temperature and pressure, cyclopentadienyl beryllium hydride is obtained.

When the process of Example 2 is repeated except for the replacement of the dicyclopentadienyl beryllium with bis(methylcyclopentadienyl) beryllium,
bis(ethylcyclopentadienyl) beryllium,
bis(propylcyclopentadienyl) beryllium,
bis(isopropyl cyclopentadienyl) beryllium,
bis(n-butyl cyclopentadienyl) beryllium,
bis(isobutyl cyclopentadienyl) beryllium,
bis(tertiary butyl cyclopentadienyl) beryllium,
bis(n-hexyl cyclopentadienyl) beryllium,
bis(n-octyl cyclopentadienyl) beryllium,
bis(isooctyl cyclopentadienyl) beryllium,
bis(dimethyl cyclopentadienyl) beryllium,
bis(diethyl cyclopentadienyl) beryllium,
bis(methylethyl cyclopentadienyl) beryllium, or mixtures of the foregoing, similar results are obtained.

For the sake of clarity in discussing reaction conditions, the two stages, disclosed above, of the reaction of the invention will be discussed separately. The preparation of the solution of beryllium hydride in the cyclopentadienyl beryllium compound will be referred to as the solution stage and the preparation of the cyclopentadienyl beryllium hydride from this solution as the reaction stage.

The solution stage

As indicated above, a wide variety of simple and substituted cyclopentadienyl beryllium compounds can be employed as solvents for beryllium hydride. In addition to those listed above the following cyclopentadienyl beryllium compounds may be employed:

bis(di-n-propyl cyclopentadienyl) beryllium,
bis(di-n-butyl cyclopentadienyl) beryllium,
bis(diisobutyl cyclopentadienyl) beryllium,
bis(diisohexyl cyclopentadienyl) beryllium,
bis(di-n-octyl cyclopentadienyl) beryllium,
bis(methylpropyl cyclopentadienyl) beryllium,
bis(methylisopropyl cyclopentadienyl) beryllium,
bis(n-butyl cyclopentadienyl) beryllium,
bis(isobutyl methyl cyclopentadienyl) beryllium,
bis(ethylpropyl cyclopentadienyl) beryllium,
bis(ethylisopropyl cyclopentadienyl) beryllium,
bis(ethyl-n-butyl cyclopentadienyl) beryllium,
bis(ethylisobutyl cyclopentadienyl) beryllium,
bis(ethyl-n-pentyl cyclopentadienyl) beryllium,
bis(ethylisohexyl cyclopentadienyl) berrylium,
bis(n-propyl-n-octyl cyclopentadienyl) beryllium,
bis(methyl-n-heptyl cyclopentadienyl) beryllium, and mixtures thereof.

The molar ratio of beryllium hydride to the cyclopentadienyl beryllium compound in the above solution can vary from 0.01 or less to 2.0 or more depending upon the solubility of the beryllium hydride in the particular cyclopentadienyl compound employed. In general, equimolar proportions are preferred because of the simplicity of the subsequent reaction and the relative ease of separating the resulting cyclopentadienyl beryllium hydride compound from the reaction mixture.

The solution temperature can range from 40° C. or below to 100° C. or above, but temperatures in the range of 60 to 90° C. are preferred. At temperatures below 60° C. solution proceeds so slowly as to be impractical whereas at temperatures above 90° C. conversion to the cyclopentadienyl beryllium hydride compound may begin before solution is complete, with a resultant reduction in yield.

The dissolution of the beryllium hydride can be carried out under pressures varying from 0.01 millimeter of mercury or less to 1 atmosphere or more. For ease of manipulation and because of the relative simplicity of the required apparatus, pressures in the neighborhood of 1 atmosphere are preferred.

The dissolution of the beryllium hydride will require from half an hour or less to 10 hours or more depending upon the particular cyclopentadienyl beryllium compound employed and upon the purity and particle size of the beryllium hydride. For high-purity finely divided beryllium hydride and unsubstituted dicyclopentadienyl beryllium, solution periods of 2 to 5 hours are adequate and are therefore preferred.

Solvents other than the cyclopentadienyl beryllium compound are unnecessary in the solution stage but may be employed if desired. Suitable cosolvents are benzene, toluene, cyclohexane and cyclopentadiene. When the cyclopentadienyl beryllium hydride compound is to be employed as an intermediate it can be prepared in a solvent and used without separation therefrom.

The reaction stage

In the second or reaction stage, the solution from the first stage is heated at reaction temperature for a period long enough to bring about essentially complete reaction with the formation of the cyclopentadienyl beryllium hydride compound. Reaction temperatures can range from 100° or less to 130° C. or more depending upon the other reaction conditions. For the synthesis of the unsubstituted cyclopentadienyl beryllium hydride, temperatures in the range of 105 to 115° C. are preferred because under these conditions the reaction goes to completion in a reasonable time and relatively high yield of the product can be obtained.

Reaction pressures can range from less than 0.0 to more than 1 atmosphere but atmospheric pressure is preferred for the reasons given above.

Under the foregoing reaction conditions, reaction is essentially complete in 6 to 48 hours, depending upon the particular conditions employed.

All of the foregoing reactions must of necessity be carried out under an atmosphere inert with respect to both reactants and products. Suitable atmospheres include dry nitrogen, hydrogen, helium, neon, argon, krypton, xenon and those saturated aliphatic hydrocarbons which are gaseous under the reaction conditions. Mixtures of the foregoing inert gases are also satisfactory.

The cyclopentadienyl beryllium hydride compounds prepared by the process of this invention are useful intermediates for the preparation by olefination of cyclopentadienyl beryllium alkyl compounds. They are also of great interest as the basis of a low-pressure route for the preparation of crystalline beryllium hydride and as high-energy liquid rocket fuels. Further applications include their use as terminating groups for other liquid beryllium hydride compositions of high hydrogen content, e.g., $$CpBeH(BeH_2)_nHBeCp$$

(wherein Cp represents the cyclopentadienyl group), and as components of homogeneous polymerization catalysts.

What is claimed is:

1. A solution of beryllium hydride in a dicyclopentadienyl beryllium compound which solution contains from about 0.01 to about 2 moles of beryllium hydride per mole of said dicyclopentadienyl beryllium compound.

2. The solution of claim 1 wherein said dicyclopentadienyl beryllium compound is unsubstituted dicyclopentadienyl beryllium.

3. Process for the preparation of a solution of beryllium hydride in a dicyclopentadienyl beryllium compound which comprises mixing beryllium hydride with a dicyclopentadienyl beryllium compound in a molar ratio of from about 0.01 to 1 to about 2 to 1 and heating the mixture at a temperature of from about 40 to about 100° C. for a period of from about one-half hour to about 10 hours and under a pressure of from about 0.01 millimeter of mercury to about 1 atmosphere of an inert gas.

4. The process of claim 3 wherein said dicyclopentadienyl beryllium compound is unsubstituted dicyclopentadienyl beryllium.

5. The process of claim 3 wherein said temperature is from about 60 to about 90° C.

References Cited

UNITED STATES PATENTS 3,578,516    5/1971    Sanders _____ 149—109

BENJAMIN R. PADGETT, Primary Examiner

U.S. Cl. X.R.

149—87; 260—665 R